United States Patent
Waku et al.

[11] Patent Number: 6,149,241
[45] Date of Patent: Nov. 21, 2000

[54] VEHICULAR SEAT

[75] Inventors: Seiji Waku; Harutomi Nishide, both of Saitama, Japan

[73] Assignee: Honda Giken Kogyo Kabushiki Kaisha, Tokyo, Japan

[21] Appl. No.: 09/412,399

[22] Filed: Oct. 5, 1999

[30] Foreign Application Priority Data

Oct. 6, 1998 [JP] Japan .................................. 10-284352

[51] Int. Cl.[7] ...................................................... B60N 2/06
[52] U.S. Cl. .................................... 297/463.2; 297/452.38
[58] Field of Search ............................. 297/463.1, 463.2, 297/452.38; 248/429

[56] References Cited

U.S. PATENT DOCUMENTS

| | | | |
|---|---|---|---|
| 4,973,105 | 11/1990 | Itou ................................. | 297/452.38 X |
| 5,007,682 | 4/1991 | Kuwabara et al. ................ | 297/452.38 |
| 5,228,659 | 7/1993 | Potes, Jr. et al. ................ | 248/429 |
| 5,288,133 | 2/1994 | Mizushima et al. ............... | 297/452.38 |
| 5,362,131 | 11/1994 | Susko et al. ....................... | 297/463.1 |

FOREIGN PATENT DOCUMENTS

| | | | |
|---|---|---|---|
| 65116 | 11/1982 | European Pat. Off. .......... | 297/452.38 |
| 357186534 | 11/1982 | Japan ................................. | 297/463.2 |
| 406247201 | 9/1994 | Japan ................................. | 297/463.2 |

*Primary Examiner*—Peter R. Brown
*Attorney, Agent, or Firm*—Sughrue, Mion, Zinn, Macpeak & Seas, PLLC

[57] ABSTRACT

A vehicular seat includes an upper rail fixed to a seat cushion, a lower rail attached to a vehicle body side and slidably engagable with the upper rail so as to slide the seat cushion, an angle adjusting mechanism provided on a side of the seat cushion, for adjusting the angle of a seat back; and a cover attached to the angle adjusting mechanism. Folded portions are formed at ends of the cover for covering ends of the lower rail which are left protruding from the upper rail when the seat cushion is slid.

4 Claims, 7 Drawing Sheets

VEHICULAR SEAT

BACKGROUND OF THE INVENTION

1. Field of the Invention

The present invention relates to an improved vehicular eat.

2. Description of the Related Art

FIG. 6 is a side view of a conventional vehicular seat 110. The seat 100 includes a lower rail 104 attached to a vehicle body 101 via leg portions 102,103, an upper rail 105 slidably mounted on the lower rail 104, a seat cushion 106 attached to the upper rail 105 and a seat back 107 attached to the seat cushion 106 in such a manner that the angle of the seat back can be adjusted.

In this seat 100, covers 108, 109 are mounted on the leg portions 102, 103, respectively, for covering front and rear ends of the lower rail 104 for an improved appearance.

FIGS. 7A and 7B are drawings showing an operation of the conventional vehicular seat.

In FIG. 7A, when the seat 100 is moved forward as indicated by an arrow, the upper rail 105 slides relative to the lower rail 104 and a part of the lower rail 104 and the cover 109 are left protruding from a rear end of the upper rail 105. The parts of the lower rail 104 and the cover 109 so left protruding are now referred to as a rear protruding portion 111.

In FIG. 7B, when the seat 100 is then moved backward as indicated by an arrow, the upper rail 105 slides relative to the lower rail 104, and another part of the lower rail 104 and the cover 108 are left protruding from a front end of the upper rail. The parts of the lower rail 104 and the cover 108 so left protruding are now referred to as a front protruding portion 112.

In FIGS. 7A and 7B, although the covers 108, 109 are mounted on the front and rear ends of the lower rail 104, the parts of the lower rails 104 and the covers 108, 109 are left protruding forward or rearward of the seat, respectively, depending on the position of the seat, the external appearance of the seat being thus deteriorated, and therefore an improvement in external appearance has been desired.

Moreover, since the covers 108, 109 are disposed at the front and rear ends of the lower rail 104, in a case where a plurality of seats 100 are provided on a single vehicle, there is needed a number of covers 108, 109, leading to an inconvenience that the man hours and cost for assembly are increased.

SUMMARY OF THE INVENTION

To cope with the inconvenience, it is an object of the present invention to provide a vehicular seat that can provide an improved external appearance while restraining an increase in man hours and cost for assembly.

With a view to attaining the above object, there is provided a vehicular seat including upper rails placed, respectively, on lower rails attached to a vehicle body side, a seat cushion fixed to the upper rails, an angle adjusting mechanism for adjusting the angle of a seat back provided on a side of said seat cushion and a cover attached to the angle adjusting mechanism, wherein folded portions are formed at ends of the cover for covering ends of one of the lower rails which are left protruding from one of the upper rails when the seat cushion is slid.

The ends of the lower rail that are left protruding from the upper rail when the seat cushion is slid are covered by the folded portions formed at the ends of the cover and this eliminates a risk of the rail ends from being left protruding when the seat cushion is so slid, whereby the external appearance of the seat can be improved.

In addition, since the cover for the angle adjusting mechanism also serves to cover the ends of the lower rail, the number of components is not increased, whereby the man hours and cost for assembly can be restrained from increase.

DETAILED DESCRIPTION OF THE PREFERRED EMBODIMENT

Figure 1:
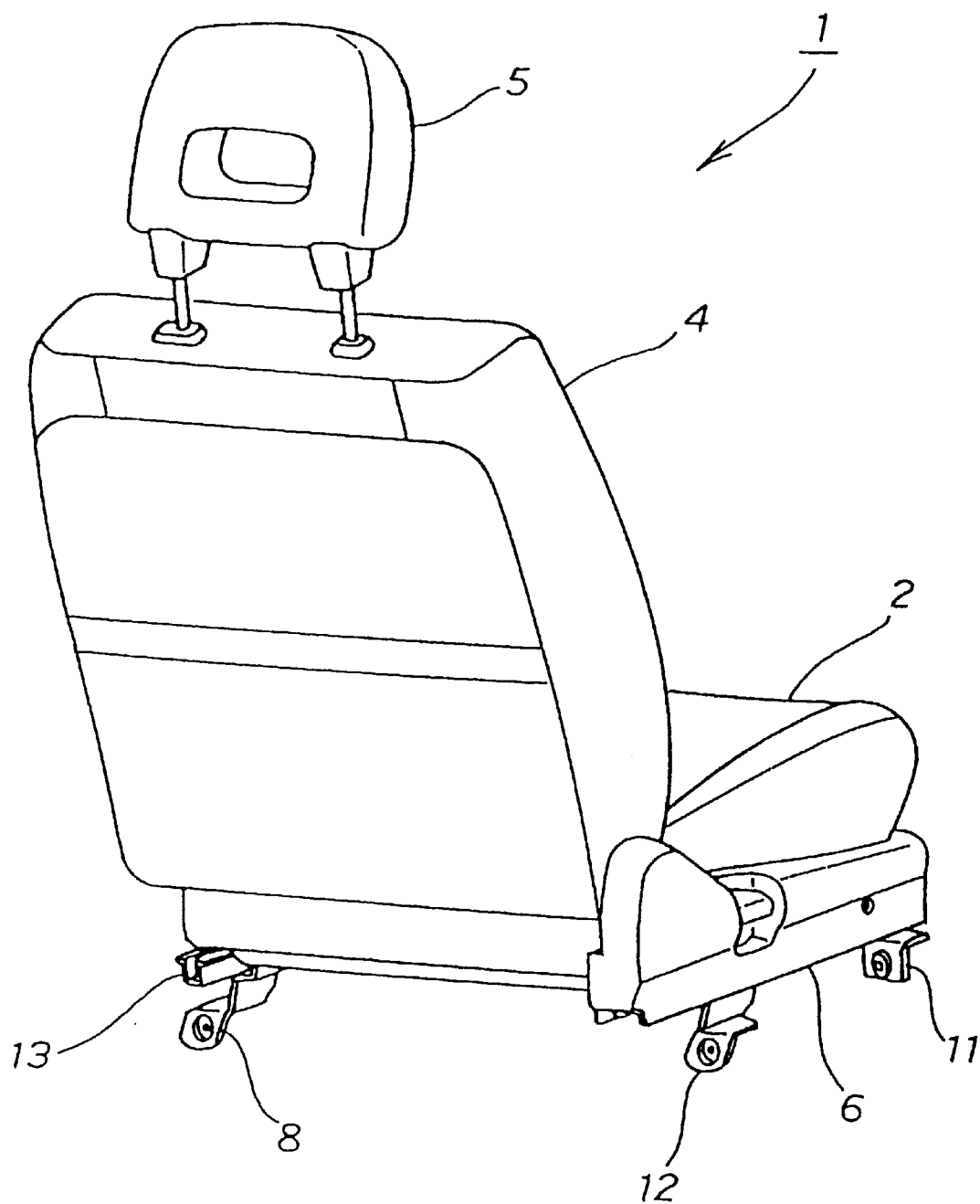
FIG. 1 is a perspective view of a vehicular seat according to the present invention.

Referring to the accompanying drawings, a mode of operation of the present invention will be described below. The drawings should be viewed as indicated by the orientation of reference numerals.

FIG. 1 is a perspective view of a vehicular seat according to the present invention. A seat 1 includes a seat cushion 2 to be taken by a driver or a passenger, a seat back 4 acting as a back of the seat which is attached to the seat cushion 2 in such a manner that the angle of the seat back 4 can be adjusted with an angle adjusting mechanism 3 (not shown but will be described later), a headrest 5 attached to a top portion of the seat back 4 and a reclining cover 6 for covering the angle adjusting mechanism 3. Reference numerals 8, 11 and 12 denote leg portions (one of the legs is not shown) at which the seat 1 is attached to a floor of a vehicle body B, and reference numeral 13 denotes a left lower rail attached to the leg portion 8.

Figure 2:
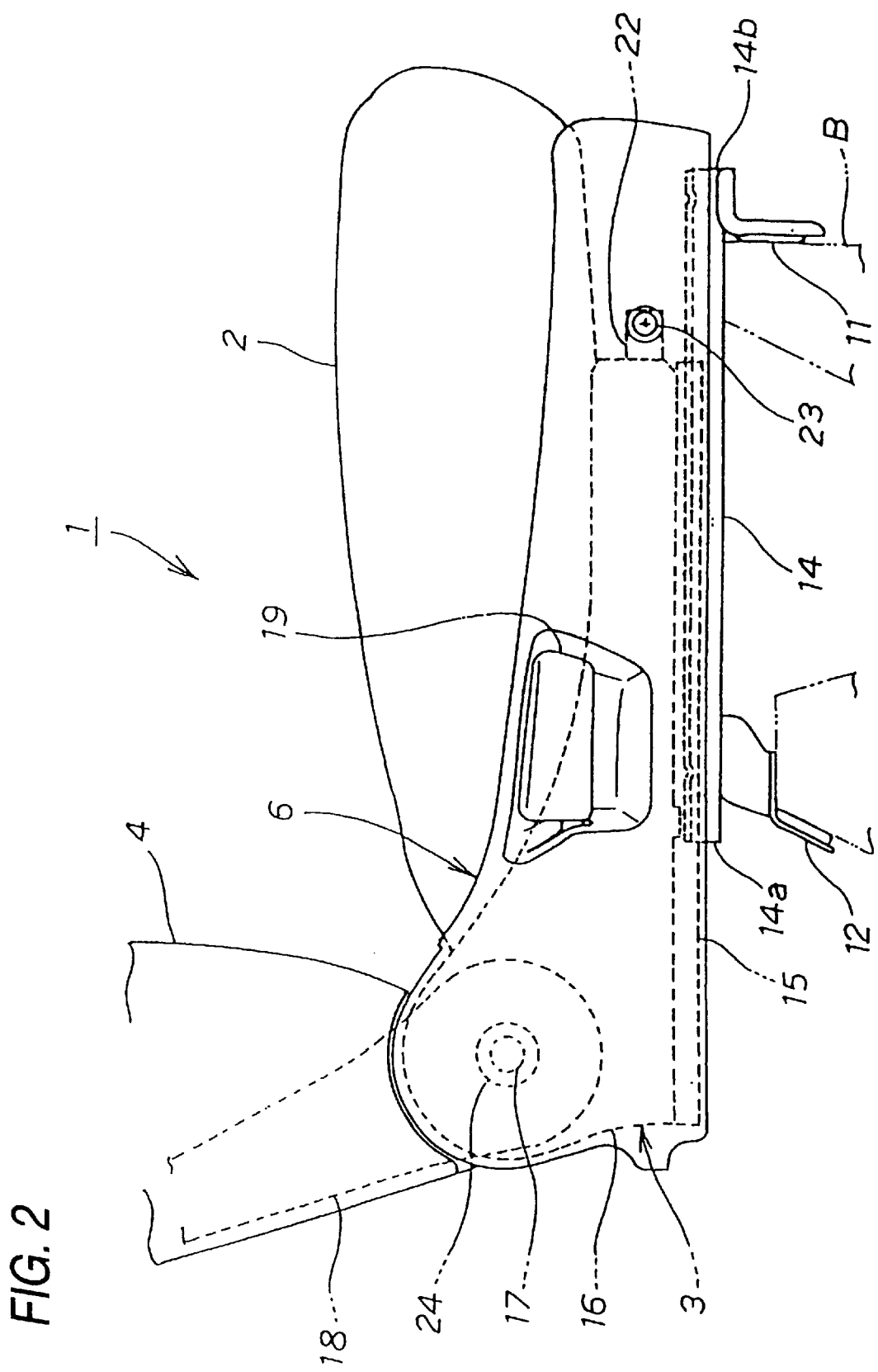
FIG. 2 is a side view of a main part of the vehicular seat according to the present invention.

FIG. 2 is a side view of a main portion of the vehicular seat according to the present invention. The seat 1 includes a right lower rail 14 attached to the leg portions 11, 12, a right upper rail 15 slidably mounted on an upper portion of the right lower rail 14, an angle adjusting mechanism 3 mounted on an upper portion of the right upper rail 15 and a reclining cover 6 mounted on the angle adjusting mechanism 3. In addition, reference numerals 14a and 14b denote, respectively, rear and front ends of the right lower rail 14. Reference character B denotes a vehicle body, and the leg portion 8 (refer to FIG. 1), 11 and 12 are attached to this vehicle body B.

The angle adjusting, the movable arm 18 being mechanism 3 includes a stationary portion 16 fixed to the upper portion of the right upper rail 15, a fulcrum portion 17 provided at a rear of the stationary portion 16, a movable arm 18 attached to the fulcrum portion 17 in such a manner that the angle thereof can be adjusted and mounted inside a within the seat back 4, and a reclining lever 19 for releasing a fixation of the seat back 4 when adjusting the angle thereof. Reference numeral 22 denotes a protruding portion provided at a front portion of the stationary portion 16 for attachment of the reclining cover 6 thereto with a machine screw 23, and reference numeral 24 denotes a jaw portion provided at the fulcrum portion 17.

Figure 3:
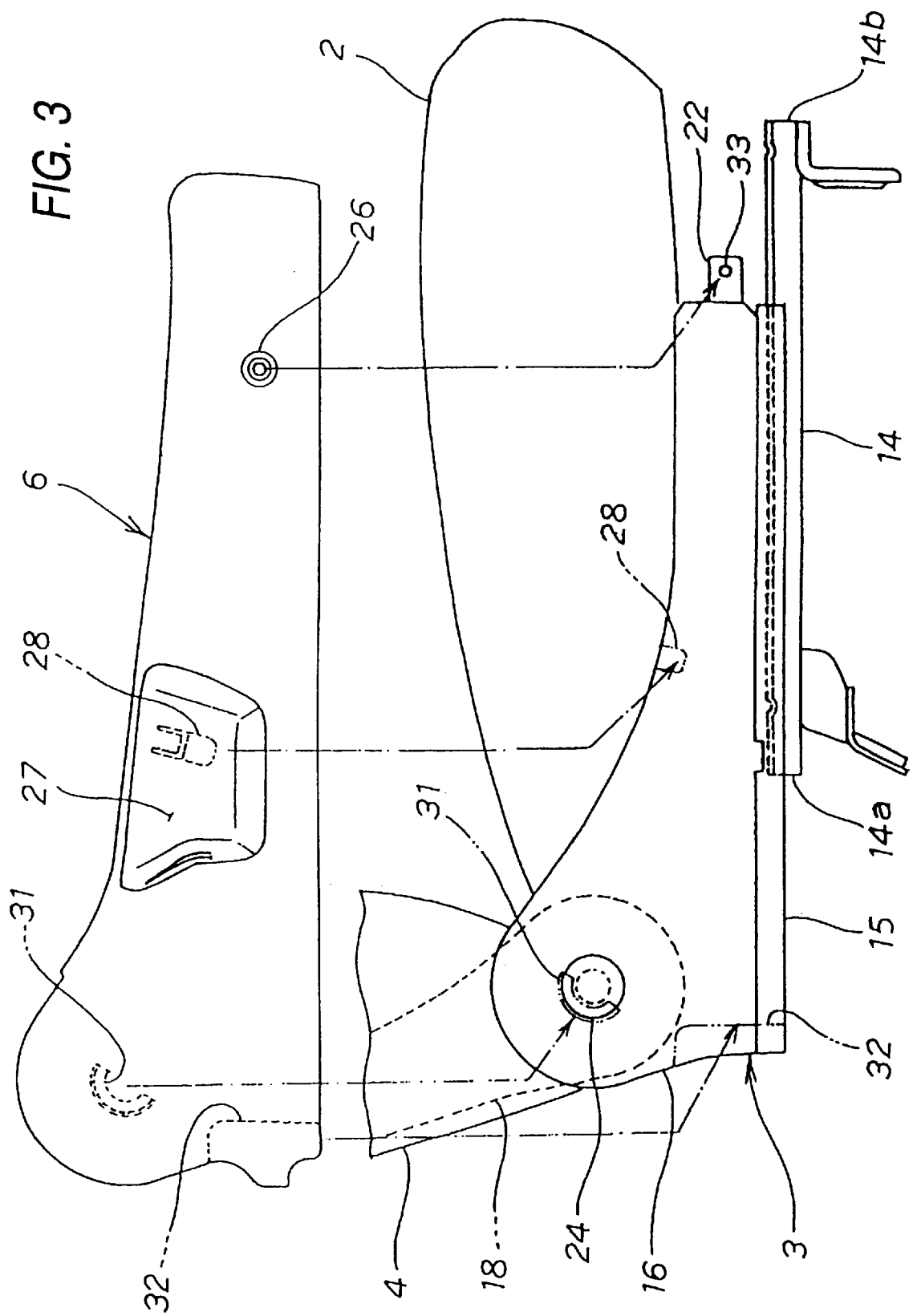
FIG. 3 is a drawing describing an assembling procedure for a reclining cover according to the present invention.

FIG. 3 is a drawing describing an assembling procedure of the reclining cover according to the present invention.

In order to be attached to the stationary portion 16 of the angle adjusting mechanism 3, the reclining cover 6 includes a deep drawn portion 26 provided at a portion close to the front portion thereof, a pawl portion 28 formed on a back of an intermediate recessed portion 27 for receiving therein the reclining lever 19 (refer to FIG. 2), an arc-like pawl portion 31 provided on a back of the reclining cover 6 on a rear upper side of the same cover 6, and a folded portion 32 provided on a rear lower side of the cover 6.

In order to attach the reclining cover 6 to the angle adjusting mechanism 3, first of all, the reclining cover 6 is moved obliquely from the upper left-hand side toward the lower right-hand side of the drawing, so that the arc-like pawl portion 31 on the reclining cover 6 is hooked on the jaw portion 24 on the angle adjusting mechanism 3, the folded portion 32 on the reclining cover 6 is hooked on a rear edge portion of the angle adjusting mechanism 3, and the pawl portion 28 on the cover 6 is hooked on an intermediate upper edge portion of the mechanism 3.

Then, the machine screw 23 (refer to FIG. 2) is let through the deep drawn portion 26 so as to be inserted into an internal thread 33 formed in the protruding portion 22 on the angle adjusting mechanism 3 in a threading fashion.

This completes the assembly of the reclining cover 6 to the angle adjusting mechanism 3.

Figure 4:
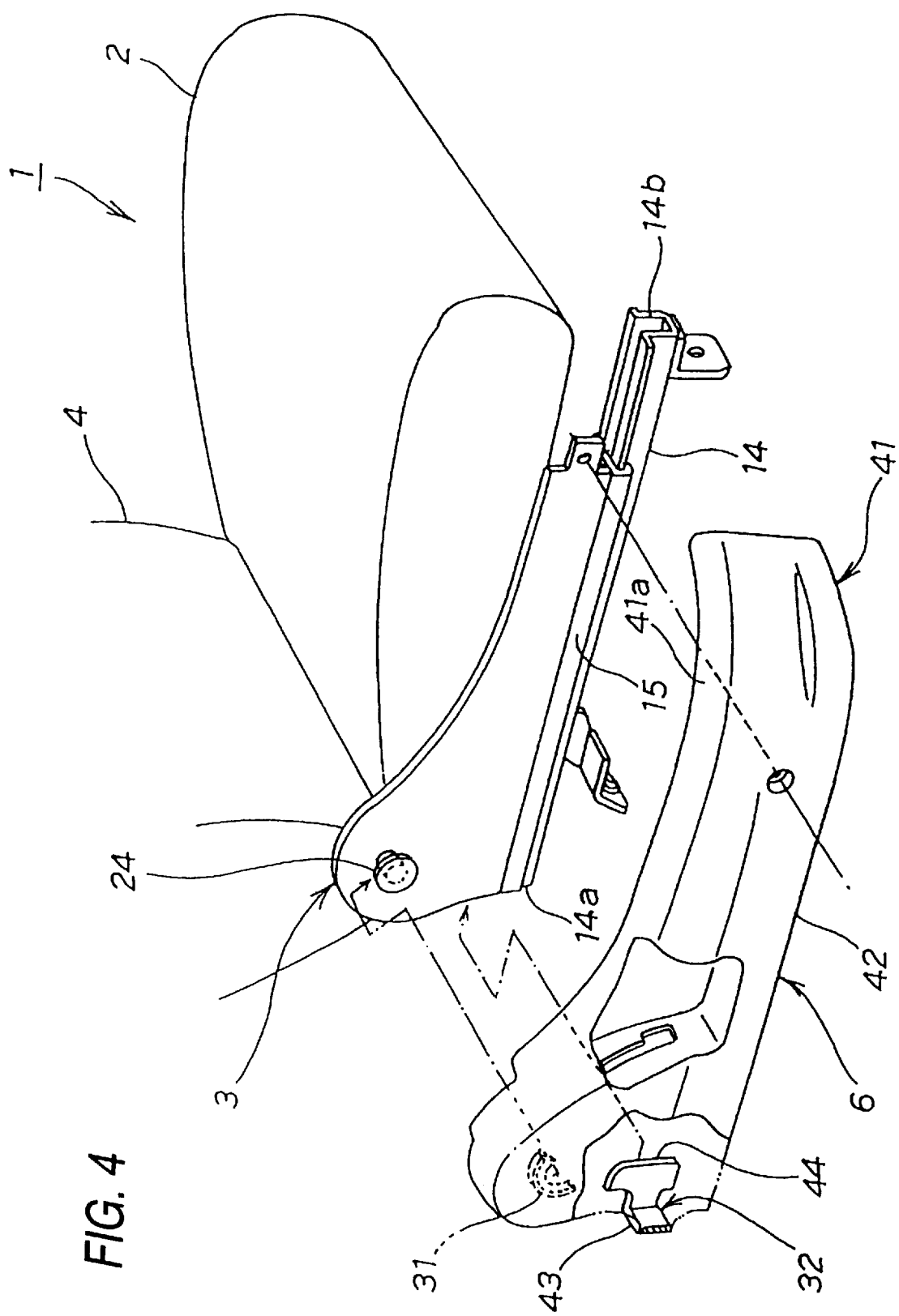
FIG. 4 is an exploded perspective view of the vehicular seat according to the present invention.

FIG. 4 is an exploded perspective view of the vehicular seat according to the present invention. The reclining cover 6 includes the folded portion 32 formed at the rear portion thereof for covering a rear end 14a of the right lower rail 14, a curved portion 41, as a folded portion, formed at a front portion thereof for covering a front end 14b of the right lower rail 14 and an upper curved portion 41a formed by curving the upper portion of the reclining cover 6 inwardly.

The folded portion 32 includes a rear protruding portion 43 allowed to protrude laterally from a rear end thereof at a position higher than a bottom side 42 of the reclining cover 6, and a front protruding portion 44 allowed to extend forward from an end of this rear protruding portion 43.

The curved portion 41 is formed into a smoothly curved configuration so as to improve the external appearance when viewed from the front, side and front half side.

The upper curved portion 41a is intended to improve the external appearance as viewed from the top of the seat 1 and designed to cover an upper portion of the angle adjusting mechanism 3 and an upper portion of the right lower rail 14 which protrudes forward from the right upper rail 15.

The right lower rail 14 is a member having an inverted Ω-like cross-section, and the right upper rail 15 is slidably mounted on the right lower rail 14 by allowing the lower rail 14 to fit in the right upper rail 15 having a cross-section formed into a substantially angular C-shape or a square or rectangular shape which is made open at a bottom side thereof.

The external appearance of the seat is deteriorated when the front end 14b and rear end 14a of the right lower rail 14 are left protruding from the front and rear ends of the right upperrail, respectively. Therefore, a cover is needed to cover the front and rear ends 14b, 14a of the rail, and with the present invention, the reclining cover 6 is also provided with that function of a needed cover.

Next, an operation of the vehicular seat described heretofore will be described below.

Figure 5A:
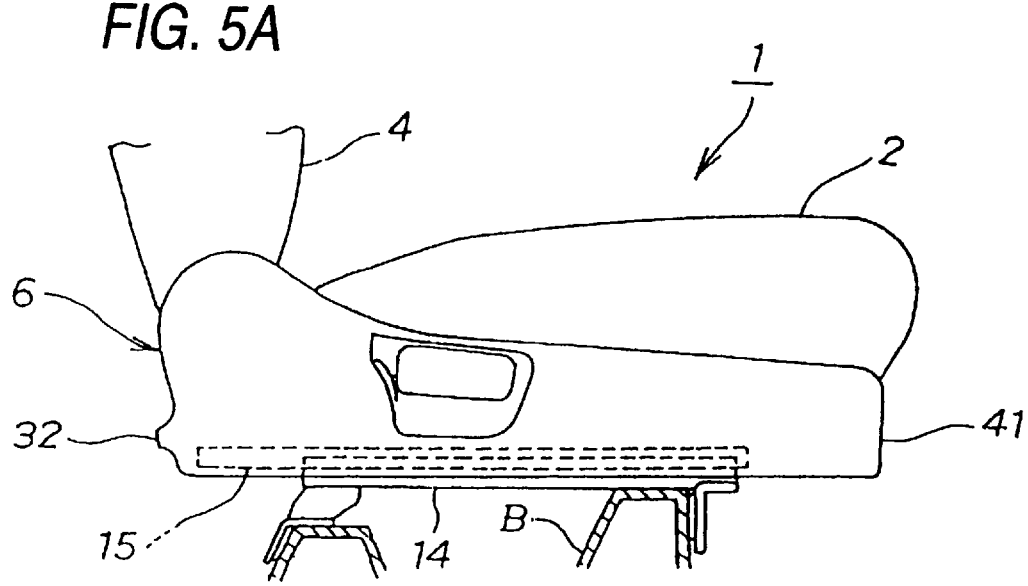
FIGS. 5A–FIG. 5C are drawings showing an operation of the vehicular seat according to the present invention.
Figure 5B:
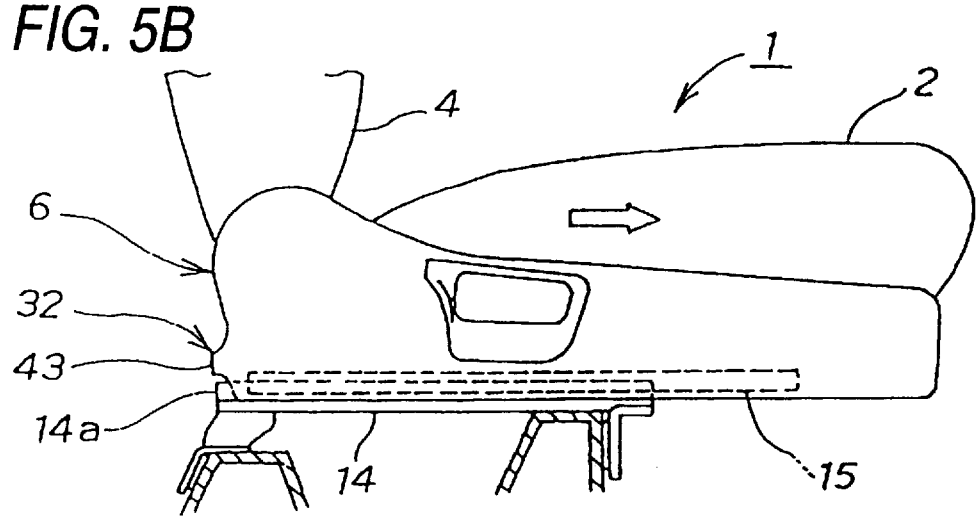
Figure 5C:
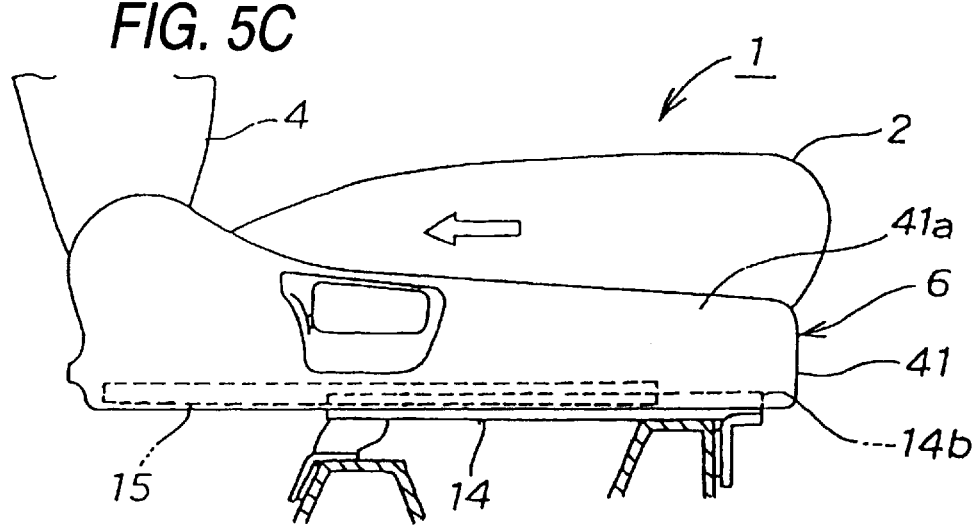
Figure 6:
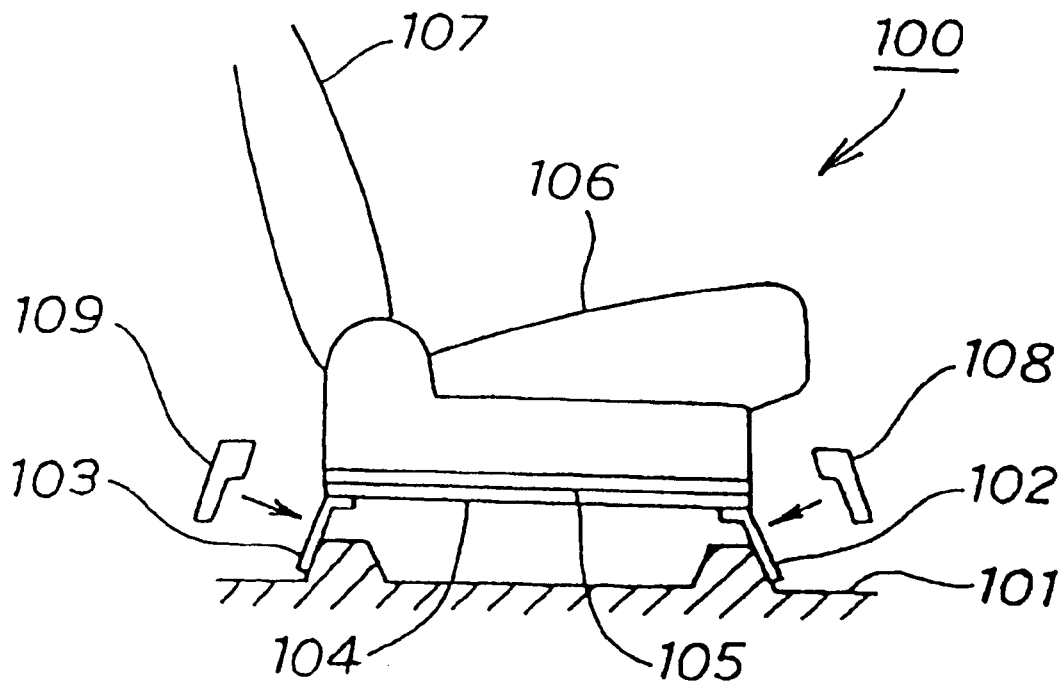
FIG. 6 is a side of a conventional vehicular seat.
Figure 7A:
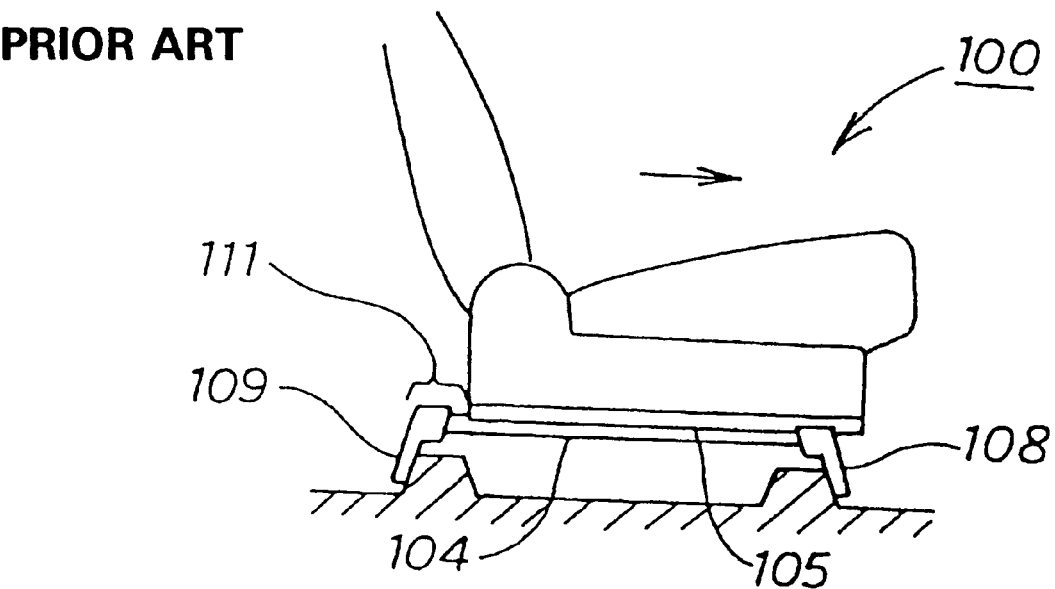
FIGS. 7A–FIG. 7B are drawings describing an operation of the conventional vehicular seat.
Figure 7B:
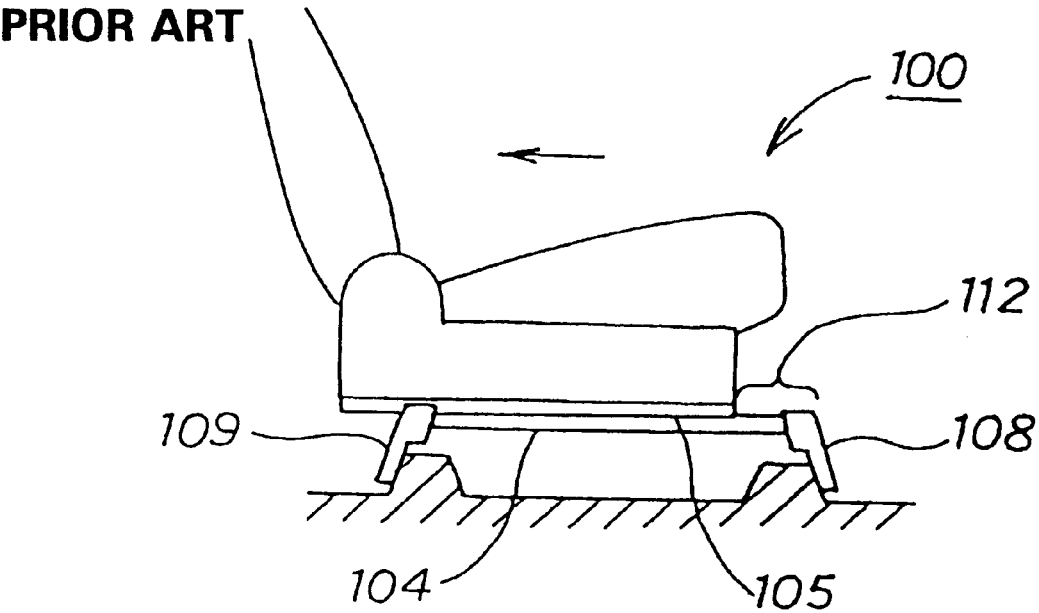

FIGS. 5A to 5C are drawings describing an operation of the vehicular seat according to the present invention.

FIG. 5A shows a state in which the seat 1 is positioned substantially at the center of an overall longitudinal sliding range thereof. That is, the right upper rail 15 is positioned substantially above the right lower rail 14.

In FIG. 5B, the seat 1 is slid to a frontmost position of the sliding range, and as a part of this movement, the seat cushion 2, the seat back 4, the angle adjusting mechanism 3 (refer to FIG. 4), the reclining cover 6 and the right upper rail 15 are all moved forward relative to the right lower rail 14.

When this happens, the rear end 14a of the right lower rail 14 does not protrude from the rear protruding portion 43 of the folded portion 32, which is the rear end of the reclining cover 6. In the drawing, the rear end 14a and the rear protruding portion 43 are positioned on the same vertical plane.

In FIG. 5C, the seat 1 is moved to a rearmost position of the sliding range, and as a part of this movement, the seat cushion 2, the seat back 4, the angle adjusting mechanism 3 (refer to FIG. 4), the reclining cover 6 and the right upper rail 15 are all moved backward relative to the right lower rail 14.

When this happens, the front end 14b of the right lower rail 14 is positioned rearward of the curved portion 41 of the reclining cover 6 and is left hidden inside the curved portion 41.

In addition, the front end 14b of the right lower rail 14 is covered from the top with the upper curved portion 41a of the reclining cover 6. Therefore, the front end 14b of the right lower rail 14 is made invisible from the front, side and front half side of the seat 1.

Thus, as described referring to FIG. 5B and 5C, the folded portion 32 and the curved portion 41 are formed at ends of the reclining cover 6 so as to cover the ends of the right lower rail 14 which protrude from the right upper rail 15. Accordingly, when the seat cushion 2 (or the seat 1) is slid, the rear end 14a and the front end 14b of the right lower rail 14 do not protrude rearward or forward from the reclining cover 6, that is, the seat 1 and further are kept invisible from above, thereby making it possible to improve the external appearance of the seat 1.

In addition, since the reclining cover 6 originally designed to cover the angle adjusting mechanism 3 is also designed to cover the rear end 14a and the front end 14b of the right lower rail 14, an increase in parts, man hours and cost can be restrained.

In the mode of operation of the present invention, in FIG. 4, the reclining cover 6 is described as being provided on the right-hand side of the seat 1, but the reclining cover 6 may be provided on the left-hand side of the seat 1 with the folded portion 32, the curved portion 41 and the upper curved portion 41a being provided thereon in the same manner as that in which they are provided on the reclining cover 6 on the right-hand side of the seat 1.

With the aforesaid construction, the present invention exhibits the following effectiveness.

With the vehicle sheet which includes upper rails placed, respectively, on lower rails attached to a vehicle body side, a seat cushion fixed to the upper rails, an angle adjusting mechanism for adjusting the angle of a seat back provided on a side of the seat cushion and a cover attached to the angle adjusting mechanism, since the folded portions are formed on the end portions of the cover for covering the end portions of the lower rail which are left protruding when the seat cushion is slid, the end portions of the lower rail do not protrude forward or rearward of the seat when the seat cushion is slid, thereby making it possible to provide an improved external appearance of the seat.

In addition, since the cover for the angle adjusting mechanism is also designed to function to cover the end portions of the lower rail, there is provided no additional part, whereby an increase in man hours and cost can be restrained.

While only certain embodiments of the invention have been specifically described herein, it will be apparent that numerous modifications may be made thereto without departing from the spirit and scope of the invention.

The present disclosure relates to the subject matter contained in Japanese patent application No. Hei.10-284352 filed on Oct. 6, 1998 which is expressly incorporated herein by reference in its entirety.

What is claimed is:

1. A vehicular seat, comprising:

an upper rail fixed to a seat cushion;

a lower rail adapted to be attached to a vehicle body side and slidably engaged with said upper rail so as to slide said seat cushion;

an angle adjusting mechanism provided on a side of said seat cushion, which adjusts the angle of a seat back; and a one-piece cover attached to said angle adjusting mechanism, wherein folded portions are formed at ends of said cover for covering ends of said lower rail which are left protruding from said upper rail and when said seat cushion is slid, and further wherein one of said folded portions formed at a rear portion of said cover includes a rear protruding portion which protrudes laterally from the rear portion and a front protruding portion which extends forward from an end of said rear protruding portion.

2. A vehicular seat, comprising:

an upper rail fixed to a seat cushion, said upper rail having a first length;

a lower rail adapted to be attached to a vehicle body side and having a second length, said lower rail being slidably engaged with said upper rail so that said seat cushion is slidable by a third length in a longitudinal direction of said lower rail;

an angle adjusting mechanism provided on a side of said seat cushion, which adjusts the angle of a seat back; and a one-piece cover attached to said angle adjusting mechanism, said cover having a length of substantially the sum of the second length plus the third length, wherein folded portions are formed at ends of said cover for covering ends of said lower rail which are left protruding from said upper rail and when said seat cushion is slid, and further wherein one of said folded portions formed at a rear portion of said cover includes a rear protruding portion which protrudes laterally from the rear portion and a front protruding portion which extends forward from an end of said rear protruding portion.

3. A vehicular seat according to claim 2, wherein said upper rail includes two upper side rails provided on sides of said seat cushion, said lower rail includes two lower side rails, and said cover is disposed on one of the sides of said seat cushion.

4. A vehicular seat according to claim 2, wherein the first length of said upper rail is longer than the second length of said lower rail.

* * * * *